US009063028B2

(12) United States Patent
Beck

(10) Patent No.: US 9,063,028 B2
(45) Date of Patent: Jun. 23, 2015

(54) APPARATUS AND METHOD FOR DETECTION OF MECHANICAL INPUTS

(75) Inventor: Idan Beck, San Francisco, CA (US)

(73) Assignee: INCIDENT TECHNOLOGIES, INC., San Francisco, CA (US)

( * ) Notice: Subject to any disclaimer, the term of this patent is extended or adjusted under 35 U.S.C. 154(b) by 451 days.

(21) Appl. No.: 12/841,703

(22) Filed: Jul. 22, 2010

(65) Prior Publication Data
US 2012/0022796 A1   Jan. 26, 2012

(51) Int. Cl.
*G01L 1/18* (2006.01)
*G01H 17/00* (2006.01)
*G06F 19/00* (2011.01)
*G06F 17/40* (2006.01)
*G01L 23/22* (2006.01)

(52) U.S. Cl.
CPC .............. *G01L 23/226* (2013.01); *G06F 19/00* (2013.01); *G06F 17/40* (2013.01); *G01H 17/00* (2013.01); *G01L 1/18* (2013.01)

(58) Field of Classification Search
USPC ........ 33/501; 73/66, 460, 471, 570, 649, 760, 73/763, 786, 865.8; 340/500, 540, 665; 702/1, 33, 34, 41, 42, 56, 127, 187, 702/189
See application file for complete search history.

(56) References Cited

U.S. PATENT DOCUMENTS

| 2,478,720 | A | * | 8/1949 | Sourwine et al. | 73/771 |
| 2,924,094 | A | * | 2/1960 | Hast | 73/768 |
| 3,495,079 | A | * | 2/1970 | Halawa Janusz et al. | 702/42 |
| 3,582,692 | A | * | 6/1971 | Palini | 310/330 |
| 3,585,415 | A | * | 6/1971 | Muller et al. | 310/319 |
| 3,673,354 | A | * | 6/1972 | Oda et al. | 369/145 |
| 4,047,144 | A | * | 9/1977 | Wong | 338/2 |
| 5,099,742 | A | | 3/1992 | Meno | |
| 5,204,670 | A | * | 4/1993 | Stinton | 340/10.5 |
| 5,206,449 | A | | 4/1993 | McClish | |
| 6,292,108 | B1 | * | 9/2001 | Straser et al. | 340/870.11 |
| 6,640,644 | B1 | | 11/2003 | Mireles et al. | |
| 2010/0161283 | A1 | * | 6/2010 | Qing et al. | 702/188 |

FOREIGN PATENT DOCUMENTS

SU      960554 A  *  9/1982
SU     1430767 A  * 10/1988

* cited by examiner

*Primary Examiner* — Edward Cosimano
(74) *Attorney, Agent, or Firm* — Novak Druce Connolly Bove + Quigg LLP

(57) ABSTRACT

Embodiments of the invention provide apparatus and method for analyzing mechanical inputs. The apparatus comprises mechanical elements configured to receive mechanical inputs and a piezoresistive sensor configured to convert the mechanical inputs into electric signals. The apparatus further includes electrical elements configured to determine voltage components of the electric signals and a processor configured to analyze the voltage components, wherein the voltage components are analyzed to determine a plurality of characteristics of the mechanical inputs.

19 Claims, 5 Drawing Sheets

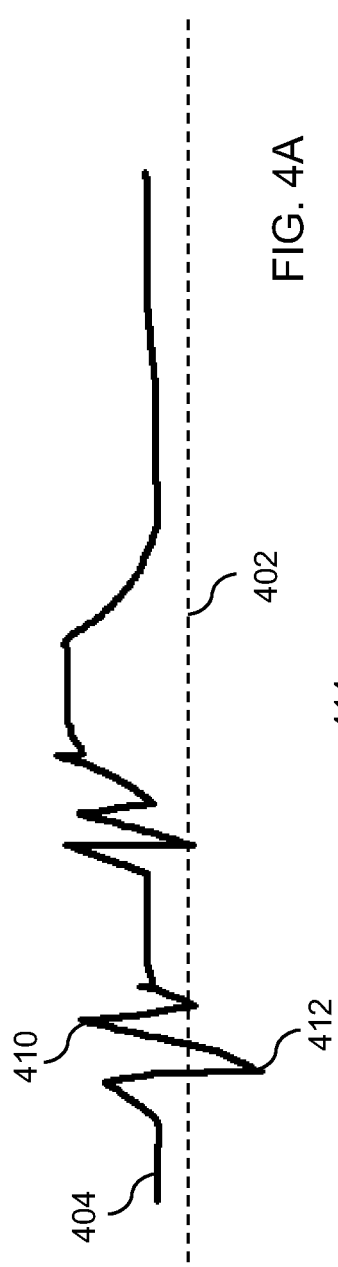
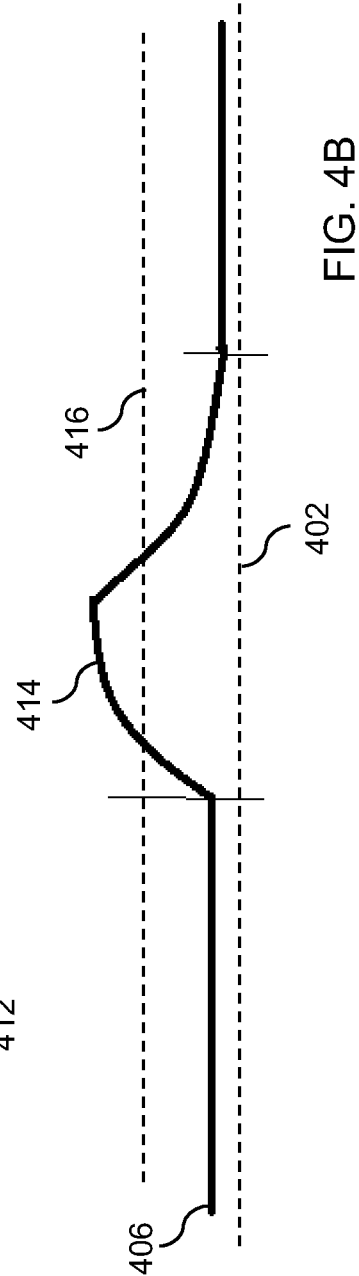
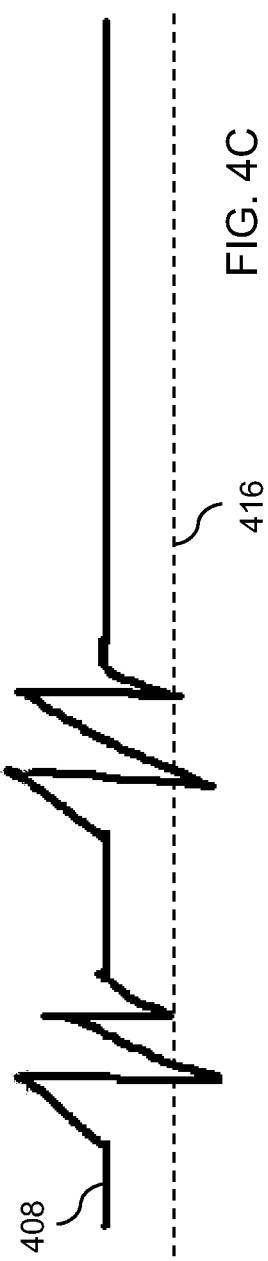

APPARATUS AND METHOD FOR DETECTION OF MECHANICAL INPUTS

FIELD OF THE INVENTION

The invention relates to detection of mechanical inputs and more specifically the invention relates to the use of piezoresistive elements for detection of mechanical inputs.

BACKGROUND OF THE INVENTION

The structures of building, vehicles, devices and other objects may be subjected to mechanical stresses and vibrations. For example, the engines of vehicles may vibrate on ignition. Similarly, the structures of buildings may encounter stresses and vibrations due environmental factors. Furthermore, various devices such as earthquake measuring instruments may use the vibrations and tensions in various mechanical elements as mechanical inputs to calculate the intensity and other characteristics of the earthquake.

Typically, various types of sensors are used to measure the stress or tension and vibrations on the structures. It is well known that there is a change in electrical resistance of a piezoresistive material when a mechanical stress is applied. Therefore, piezoresistive elements may be used in electrical circuits to determine the change in electrical characteristics such as voltage and current, due to the change in resistance. An existing technique as disclosed in U.S. Pat. No. 6,640,644 assigned to Delphi Technologies, uses sensors such as piezoresistors to measure the tilt and running status of a vehicle engine. However, the technique is limited to one dimensional determination that includes either tilt or running status of the vehicle engine. Therefore, the technique may not be able to determine the value of tilt when the engine is running.

U.S. Pat. No. 5,206,449 assigned to Richard McClish, discloses the use of peizoresistive transducer to determine the vibrations of the strings of a guitar. However, this technique is limited to determination of vibration characteristics and can not be used to determine the tension as well. Another technique disclosed in U.S. Pat. No. 5,099,742 measures tensions in strings by compressible electrically conductive member. However, this technique is limited to determination of tension in the string and can not be used to determine the vibrations as inputs.

Therefore, the techniques are desirable for effective determination of the mechanical inputs.

SUMMARY

The present invention provides an apparatus for analyzing mechanical inputs. The apparatus comprises one or more mechanical elements configured to receive one or more mechanical inputs; a piezoresistive sensor configured to convert the mechanical inputs into one or more electric signals; one or more electrical elements configured to determine a plurality of voltage components of the electric signals; and a processor configured to analyze the voltage components, wherein the voltage components are analyzed to determine a plurality of characteristics of the mechanical inputs.

The invention further provides a method for analyzing mechanical inputs. The method comprises receiving one or more mechanical inputs at one or more mechanical elements; converting the mechanical inputs into one or more electric signals by a piezoresistive sensor, generating a plurality of voltage components of the electric signals by one or more electrical elements; and analyzing the voltage components by a processor, wherein the voltage components are analyzed to determine a plurality of characteristics of the mechanical inputs.

The invention further provides an apparatus for analyzing mechanical inputs. The apparatus comprises one or more mechanical elements configured to receive one or more mechanical inputs; a piezoresistive sensor coupled to the strings, wherein the sensor is configured to convert the mechanical inputs into one or more electric signals; one or more electrical elements configured to determine an average voltage and one or more transient voltages of the electric signals; a converter configured to convert the average voltage and one or more transient voltages from analog values to digital values; and a processor configured to determine a plurality of characteristics of the mechanical inputs based on the digital values of the average voltage and the one or more transient voltages.

An aspect of the invention is to determine tension and vibrations in the mechanical elements.

BRIEF DESCRIPTION OF THE DRAWINGS

Figure 1:
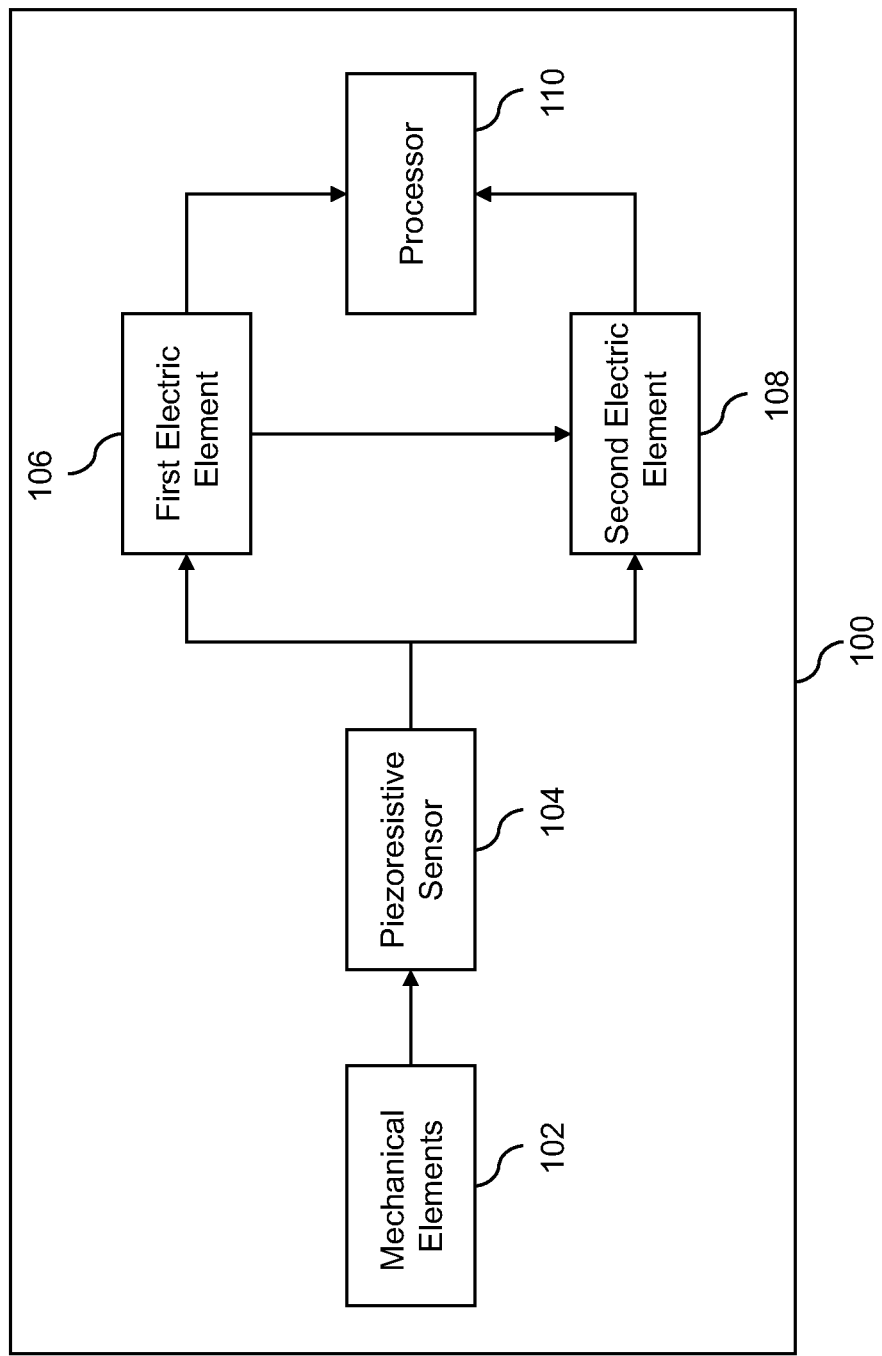
Figure 2:
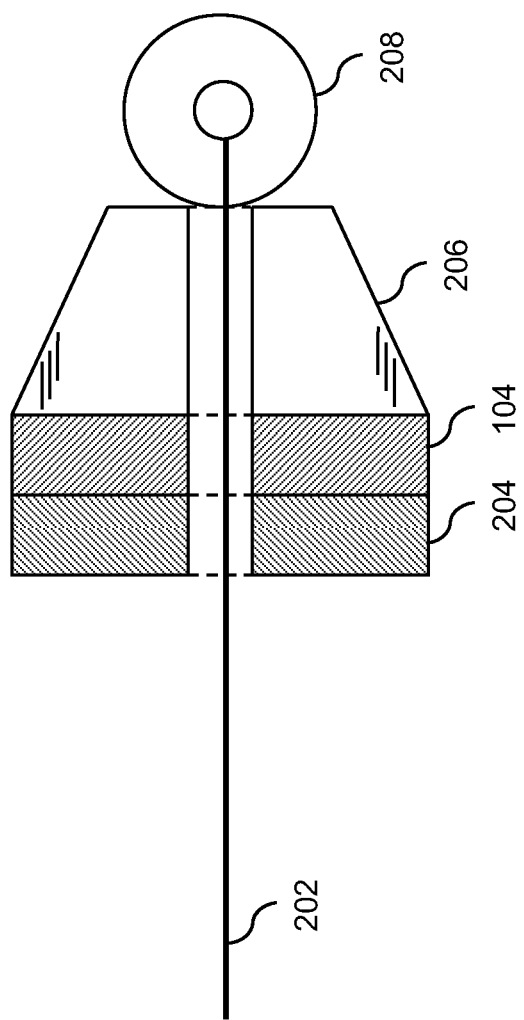
Figure 3B:
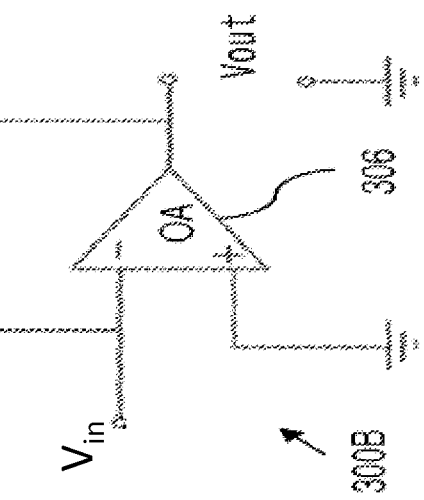
Figure 3A:
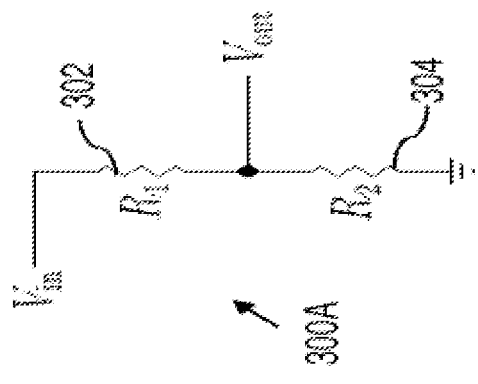
Figure 5:
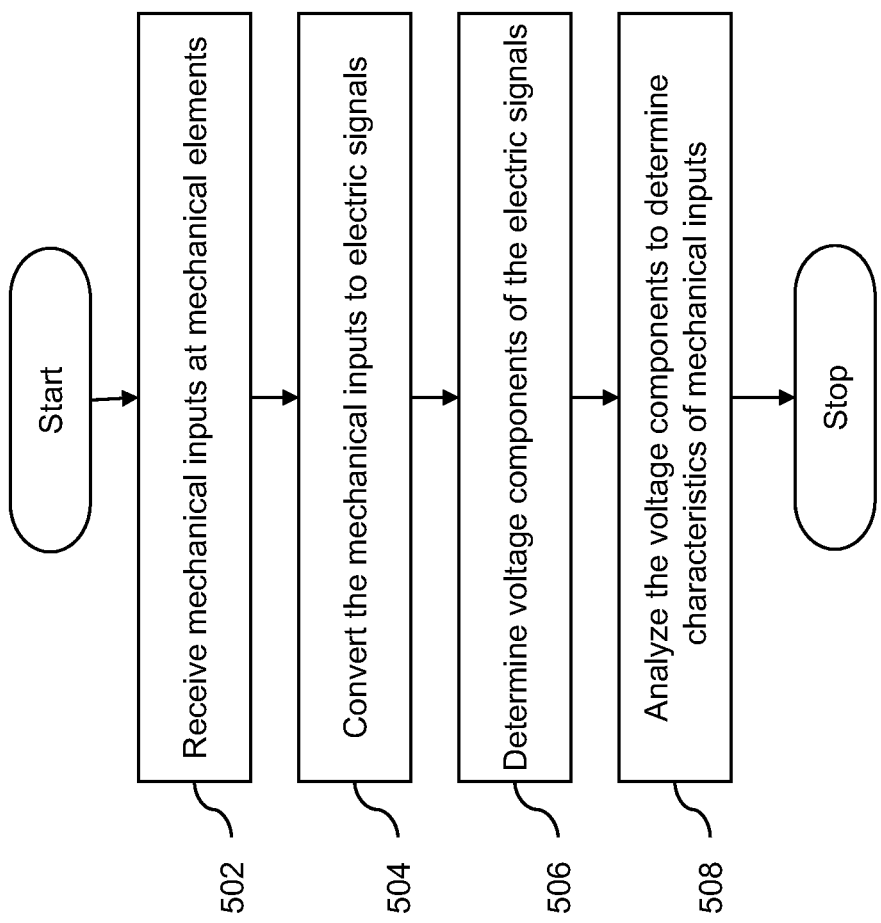

Having thus described the invention in general terms, reference will now be made to the accompanying drawings, which are not necessarily drawn to scale, and wherein:

FIG. 1 illustrates an apparatus for analyzing mechanical inputs, in accordance with an embodiment of the invention;

FIG. 2 illustrates an arrangement for determination of mechanical inputs, in accordance with an embodiment of the invention;

FIGS. 3A and 3B illustrate exemplary circuit diagrams for converting mechanical inputs to electric signals;

FIGS. 4A, 4B, and 4C illustrate exemplary electric signals and components corresponding to mechanical inputs; and FIG. 5 is a flowchart illustrating the process of analyzing the mechanical inputs, in accordance with an embodiment of the invention.

DETAILED DESCRIPTION OF THE INVENTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

With reference to FIG. 1 an apparatus 100 for analyzing mechanical inputs is illustrated, in accordance with an embodiment of the invention. Apparatus 100 can determine and analyze various characteristics of mechanical inputs, for example, tension and mechanical vibrations by converting them to electric signals. Mechanical elements 102 of apparatus 100 determine or receive the mechanical inputs. Examples of mechanical elements 102 include, but are not limited to, strings, beams, cantilevers, or other mechanical elements that can sustain mechanical stress due to tension and vibrations. Each of mechanical elements 102 is connected to a piezoresistive sensor 104. In an embodiment of the invention, mechanical elements 102 may be connected to a single piezoresistive sensor. Further, mechanical elements 102 may be under mechanical stresses or provided a predefined tension before applying the mechanical inputs.

Piezoresistive sensor 104 generates electric signals based on the mechanical inputs. It is well known that the resistance of piezoresistive materials change based on the amount of physical deformation. Therefore, when mechanical inputs are provided to mechanical elements 102, the resistance of piezoresistive material in piezoresistive sensor 104 changes and corresponding electric signals are generated. The electric signals may be then analyzed by a first electric element 106 (hereafter referred to as first element 106) and a second electric element 108 (hereafter referred to as second element 108) to generate two voltage components of the electric signals.

First element 106 may determine an average voltage value for the electric signal. In an embodiment of the invention, first element 106 may be a low pass filter that eliminates electric signals having frequencies higher than a predefined frequency level to calculate the average voltage. For example, electric signals with a frequency more than 100 Hz may be filtered out. The average voltage corresponds to an average or a constant tension in mechanical elements 102. Further, the average voltage may remain same when a constant force is applied and changes when the constant force changes. For example, when mechanical elements 102 are displaced and thus applying a constant tension. Further, the electric signals may include transient voltages, for example, the voltages generated by vibrations of mechanical elements 102.

Second element 108 analyzes the electric signals for the transient voltages in the electric signal. The average voltage value is sent from first element 106 to second element 108. Thereafter, the values of the transient voltages may be determined based on the average voltage value. For example, the transient voltage values may include values that are centered about zero after eliminating the average voltage values from the electric signal. In an embodiment of the invention, second element 108 may be a high-pass filter or a biased high-pass filter that filters out electric signals having frequencies lower than the predefined frequency level. For example, electric signals with a frequency less than 100 Hz may be filtered out. Furthermore, second element 108 may filter out the electric signals that have frequencies outside a predefined frequency range. For example, electric signals with a frequency outside the range of 50 Hz to 100 Hz may be filtered out. The transient voltage values may be generated by vibrations of mechanical elements 102. In an embodiment of the invention, apparatus 100 may include a converter for converting the outputs of first element 106 and second element 108 from analog to digital. Exemplary electric signals and voltage components are illustrated in conjunction with FIGS. 4A, 4B, and 4C.

Thereafter, the transient voltage values and the average voltage values are sent to a processor 110. Processor 110 may then process the voltage component including the transient voltages and the average voltage to determine the characteristics of the mechanical inputs, such as tension and vibrations. For example, processor 110 may determine the magnitude and articulation of mechanical elements 102 based on the outputs of first element 106 and second element 108. Furthermore, processor 110 may determine complex mechanical inputs based on the time information of the vibrations. The time information may be for example, the time required by mechanical element 102 to reach a highest frequency, time for which a frequency is sustained, time to drop to a previous frequency and so forth. Furthermore, processor 110 may calibrate piezoresistive sensor 104 based on the average voltage level. For example, mechanical elements 102 may be provided a tension before applying mechanical inputs. Therefore, processor 110 may use the average voltage information to calibrate apparatus 100.

An exemplary arrangement for determination of mechanical inputs is illustrated with reference to FIG. 2. As shown, the mechanical element is in the form of a string 202 that determines mechanical inputs. String 202 is connected at one end to a ring 208 that can be used to make string 202 tight or loose. Further, ring 208 exerts pressure on piezoresistive sensor 104 through pressure distribution element 206. As shown, the shape of pressure distribution element 206 is trapezoidal to uniformly distribute the pressure on the surface of piezoresistive sensor 104. However, a person skilled in the art will appreciate that any other suitable shape can be selected. Therefore, piezoresistive sensor 104 may be fixed between pressure distribution element 206 and a block 204. Block 204 may be for example, a supporting structure of an apparatus for analyzing the mechanical inputs. When string 202 is stressed, for example, by vibrations or tension, then the stress is transferred to piezoresistive sensor 104. As a result, the resistance of the material of piezoresistive sensor 104 changes. The changes in the resistance are used to generate electric signals. The electric signals may be generated in the electric circuit of piezoresistive sensor 104, which is shown with reference to FIGS. 3A and 3B.

FIG. 3A illustrates an exemplary circuit 300A for converting the mechanical inputs to electric signals from piezoresistive sensor 104. Circuit 300A represents a typical resistive-divider that produces an output voltage (Vout) that is a fraction of the input voltage (Vin). The Vin may be provided to piezoresistive sensor 104 from power source, for example, but not limited to a battery.

Circuit 300A may include a resistor R1 302 and a resistor R2 304. Resistor R2 304 may correspond to the resistance of piezoresistive sensor 104. Further, as discussed above, the resistance of piezoresistive sensor 104 may change based on the stresses. The mathematical equation for output voltage in this case is:

$$V\text{out}=(R2/(R1+R2))*V\text{in}.$$

As a result, the value of Vout may change based on the resistance of piezoresistive sensor 104. Further, the value of the voltage may change frequently based on the type of stress. For example, the voltage may remain constant at a particular level in case of tension, whereas the voltage may fluctuate in case of vibrations in the mechanical elements.

FIG. 3B illustrates an exemplary circuit 300B for converting the mechanical inputs to electric signals from piezoresistive sensor 104. As discussed above, resistor R2 304 may correspond to the resistance of piezoresistive sensor 104. Further, as discussed above the resistance of piezoresistive sensor 104 may change based on the stresses. Therefore, R2 304 may be used as a current source by connecting it to an Operational Amplifier (OA) 306.

In this case, OA 306 may amplify the current Iin provided to R2 304. Further, Iin may be converted to voltage Vout. The mathematical equation for output voltage in this case is:

$$V\text{out}=-I\text{in}*R2.$$

Therefore, better control may be applied to the current and voltage changes. As a result, the mechanical inputs may be detected with a greater accuracy. Although, limited examples of circuit are discussed, a person skilled in the art will appreciate that other circuit may be used to detect the changes in voltage or current without deviating from the scope of the invention. Exemplary waveforms for electric signals corresponding to the mechanical inputs are illustrated with reference to FIGS. 4A, 4B, and 4C.

FIG. 4A illustrates values of Vout as a waveform. As shown in FIG. 4A, a voltage line 402 may represent an initial level of tension that may be provided to the mechanical elements before applying mechanical inputs. For example, the mechanical element may be tuned to a particular stress level such that voltage line 402 indicates a voltage of 0.5 volts. A person skilled in the art will appreciate that the mechanical elements can be tuned to any initial stress level or voltage based on the application of the apparatus. A waveform 404 may be generated based on the voltage fluctuations when the mechanical inputs are provided to the mechanical elements as discussed above. Waveform 404 may include peaks such as a high peak 410 and a low peak 412. For example, high peak 410 may be generated when the stress is more that the initial stress and low peak 412 may be generated when the stress is less that the initial stress. Generally, low peak 412 is generated because the initial stress may be relieved by the mechanical inputs.

FIG. 4B and FIG. 4C illustrate waveforms for the voltage components that are analyzed by first element 106 and second element 108. As shown in FIG. 4B, waveform 404 may be analyzed by first element 108 to generate a waveform 406. Waveform 406 may be formed by filtering out the voltages having frequencies higher than the predefined frequency level. A peak 414 may represent an increased stress that corresponds to tension in the mechanical elements. Furthermore, a voltage line 416 may indicate the average voltage level.

Further, as shown in FIG. 4C, waveform 404 may be analyzed by second element 108 to generate a waveform 408. Waveform 408 may be formed from the voltage component received by filtering out the voltages having frequencies lower than the predefined frequency level. Furthermore, the average voltage level from first element 106 may be used by second element 108 to generate waveform 408 and determine the vibrations in the mechanical elements.

FIG. 5 is a flowchart illustrating the process of analyzing the mechanical inputs, in accordance with an embodiment of the invention. At step 502, mechanical inputs are received at mechanical elements. The mechanical inputs may be for example tension and vibrations in the mechanical elements. Thereafter, at step 504 the mechanical inputs are converted to electric signals based on the characteristics by a piezoresistive sensor.

At step 506, the electric signals may be analyzed by a first electric element and a second electric element. The analysis may be performed to determine voltage components of the electric signals. The first electric element may determine an average voltage value for the electric signal. In an embodiment of the invention, first electric element may be a low pass filter that eliminates electric signals having frequencies higher than a predefined frequency level to calculate the average voltage. For example, electric signals with a frequency more than 100 Hz may be filtered out. The average voltage corresponds to an average tension in mechanical elements. Further, second electric element may analyze the electric signals for the transient voltages in the electric signal. The average voltage value is sent from the first electric element to the second electric element. Thereafter, the values of the transient voltages may be determined based on the average voltage value. For example, the transient voltage values may include values that are centered about zero after eliminating the average voltage values from the electric signal. In an embodiment of the invention, the second electric element may filter out electric signals having frequencies lower than the predefined frequency level. For example, electric signals with a frequency less than 100 Hz may be filtered out.

At step 508, the voltage components generated by the electric elements are analyzed by a processor to determine mechanical inputs. For example, the processor may determine the magnitude and articulation of the mechanical elements based on the outputs of first electric element and the second electric element. Furthermore, the processor may determine complex mechanical inputs based on the time information of the vibrations.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims.

This written description uses examples to disclose the invention, including the best mode, and also to enable any person skilled in the art to practice the invention, including making and using any devices or systems and performing any incorporated methods. The patentable scope the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An apparatus for analyzing mechanical inputs, comprising:
    one or more mechanical elements configured to receive one or more mechanical inputs;
    a piezoresistive sensor configured to convert the mechanical inputs into one or more electric signals;
    one or more electrical elements configured to determine a plurality of voltage components of the electric signals, wherein the voltage components comprise at least one of an average voltage and one or more transient voltages, the one or more transient voltages determined based on the average voltage; and
    a processor configured to analyze the voltage components, wherein the voltage components are analyzed to determine a plurality of characteristics of the mechanical inputs.

2. The apparatus of claim 1, wherein the mechanical elements comprise physical elements under mechanical stress.

3. The apparatus of claim 1, wherein the characteristics of the mechanical inputs comprise at least one of a tension and vibrations induced in the mechanical elements.

4. The apparatus of claim 1 further comprising a converter configured to convert the voltage components from analog to digital.

5. The apparatus of claim 1, wherein the average voltage corresponds to one of an average and a constant tension value in the one or more mechanical elements.

6. The apparatus of claim 1, wherein the electrical elements comprise one of a low-pass filter and a high-pass filter.

7. The apparatus of claim 1, wherein the processor IS further configured to calibrate the piezoresistive sensor based on the average voltage.

8. The apparatus of claim 1 wherein the transient voltages correspond to vibrations in the mechanical elements.

9. The apparatus of claim 8, wherein the processor is further configured to determine complex mechanical inputs based on time information of the vibrations.

10. A method for analyzing mechanical inputs, comprising:
    receiving one or more mechanical inputs at one or more mechanical elements;
    converting the mechanical inputs into one or more electric signals by a piezoresistive sensor;

determining a plurality of voltage components of the electric signals by one or more electrical elements, wherein the voltage components comprise at least one of an average voltage and one or more transient voltages, the one or more transient voltages determined based on the average voltage; and analyzing the voltage components by a processor, wherein the voltage components are analyzed to determine a plurality of characteristics of the mechanical inputs.

11. The method of claim 10, wherein the characteristics of the mechanical inputs comprise at least one of a tension and vibrations induced in the mechanical elements.

12. The method of claim 10 further comprising converting the voltage components from analog to digital by a converter.

13. The method of claim 10, wherein the average voltage corresponds to one of an average and a constant tension value in the one or more mechanical elements.

14. The method of claim 10, wherein the transient voltages correspond to vibrations in the mechanical elements.

15. The method of claim 14 further comprising determining complex mechanical inputs based on time information of the vibrations.

16. An apparatus for analyzing mechanical inputs, comprising:

one or more mechanical elements configured to receive one or more mechanical inputs;

a piezoresistive sensor coupled to the mechanical elements, wherein the sensor IS configured to convert the mechanical inputs into one or more electric signals;

one or more electrical elements configured to determine an average voltage and one or more transient voltages of the electric signals, the one or more transient voltages determined based on the determined average voltage;

a converter configured to convert the average voltage and the transient voltages from analog to digital values; and a processor configured to determine a plurality of characteristics of the mechanical inputs based on the digital values of the average voltage and the one or more transient voltages.

17. The apparatus of claim 16, wherein the sensor is calibrated based on the average voltage.

18. The instrument of claim 16, wherein the transient voltages correspond to vibrations in the mechanical elements.

19. The instrument of claim 16, wherein the average voltage correspond to one of an average tension value and a constant tension value.

* * * * *